| (12) | United States Patent | (10) Patent No.: | US 12,232,100 B2 |
|---|---|---|---|
| | Huang et al. | (45) Date of Patent: | Feb. 18, 2025 |

(54) LIMIT FOR RETRANSMISSION OF DROPPED FEEDBACK

(71) Applicant: QUALCOMM Incorporated, San Diego, CA (US)

(72) Inventors: Yi Huang, San Diego, CA (US); Ahmed Elshafie, San Diego, CA (US); Wei Yang, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 619 days.

(21) Appl. No.: 17/446,510

(22) Filed: Aug. 31, 2021

(65) Prior Publication Data

US 2022/0086851 A1 Mar. 17, 2022

Related U.S. Application Data

(60) Provisional application No. 62/706,808, filed on Sep. 11, 2020.

(51) Int. Cl.
*H04W 72/12* (2023.01)
*H04L 1/1812* (2023.01)

(52) U.S. Cl.
CPC .......... *H04W 72/12* (2013.01); *H04L 1/1812* (2013.01)

(58) Field of Classification Search
CPC ............................ H04W 72/12; H04L 1/1812
See application file for complete search history.

(56) References Cited

U.S. PATENT DOCUMENTS

| | | | | |
|---|---|---|---|---|
| 2014/0036818 | A1* | 2/2014 | Koskela | H04W 72/542 370/329 |
| 2016/0302197 | A1* | 10/2016 | Xie | H04L 12/6418 |
| 2021/0014010 | A1* | 1/2021 | Babaei | H04W 72/0446 |
| 2021/0409165 | A1* | 12/2021 | Wang | H04L 1/1614 |
| 2022/0007399 | A1* | 1/2022 | Rastegardoost | H04L 5/0055 |
| 2022/0109528 | A1* | 4/2022 | Babaei | H04W 72/04 |

FOREIGN PATENT DOCUMENTS

WO WO-2020201388 A1 * 10/2020

* cited by examiner

*Primary Examiner* — Mohammad S Adhami
(74) *Attorney, Agent, or Firm* — Harrity & Harrity, LLP

(57) ABSTRACT

Various aspects of the present disclosure generally relate to wireless communication. In some aspects, a user equipment (UE) may start a timer or counter in connection with failing to transmit a feedback message at a time for which the feedback message is scheduled for transmission. The UE may defer transmission of the feedback message for one or more attempts at transmitting the feedback message. The UE may perform one of: transmitting the feedback message before expiration of the timer or before the counter satisfying a count threshold, or discarding the feedback message after expiration of the timer or in connection with the counter satisfying the count threshold. Numerous other aspects are provided.

13 Claims, 14 Drawing Sheets

LIMIT FOR RETRANSMISSION OF DROPPED FEEDBACK

CROSS-REFERENCE TO RELATED APPLICATION

This Patent Application claims priority to U.S. Provisional Patent Application No. 62/706,808, filed on Sep. 11, 2020, entitled "LIMIT FOR RETRANSMISSION OF DROPPED FEEDBACK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for limits for retransmission of dropped feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes starting a timer (e.g., retransmission timer) in connection with failing to transmit a feedback message at a time for which the feedback message is scheduled for transmission, and deferring transmission of the feedback message for one or more attempts at transmitting the feedback message. The method includes performing one of: transmitting the feedback message before expiration of the timer, or discarding the feedback message after expiration of the timer.

In some aspects, a method of wireless communication performed by a base station includes transmitting, to a UE in a radio resource control message, an indication of a duration for a timer that the UE is to use for attempting to transmit a feedback message after failing to transmit the feedback message at a time for which the feedback message is scheduled for transmission, and scheduling a time to receive the feedback message.

In some aspects, a method of wireless communication performed by a UE includes starting a counter (e.g., retransmission counter) in connection with failing to transmit a feedback message at a time for which the feedback message is scheduled for transmission, deferring transmission of the feedback message for one or more attempts at transmitting the feedback message, and incrementing the counter after each unsuccessful attempt at transmitting the feedback message. The method includes performing one of: transmitting the feedback message before the counter satisfies a count threshold, or discarding the buffered feedback message in connection with the counter satisfying the count threshold.

In some aspects, a method of wireless communication performed by a base station includes transmitting, to a UE in a radio resource control message, an indication of a count threshold for a counter that the UE is to use for attempting to transmit a feedback message after failing to transmit the feedback message at a time for which the feedback message was scheduled for transmission, and scheduling a time to receive the feedback message.

In some aspects, a UE for wireless communication includes a memory and one or more processors coupled with the memory, the one or more processors configured to start a timer in connection with failing to transmit a feedback message at a time for which the feedback message is scheduled for transmission and defer transmission of the feedback message for one or more attempts at transmitting the feedback message. The one or more processors are configured to perform one of: transmitting the feedback message before expiration of the timer, or discarding the feedback message after expiration of the timer.

In some aspects, a base station for wireless communication includes a memory and one or more processors coupled with the memory, the one or more processors configured to transmit, to a UE in a radio resource control message, an indication of a duration for a timer that the UE is to use for attempting to transmit a feedback message after failing to transmit the feedback message at a time for which the feedback message is scheduled for transmission, and schedule a time to receive the feedback message.

In some aspects, a UE for wireless communication includes a memory and one or more processors coupled with the memory, the one or more processors configured to start a counter in connection with failing to transmit a feedback message at a time for which the feedback message is scheduled for transmission, defer transmission of the feedback message for one or more attempts at transmitting the feedback message, and increment the counter after each unsuccessful attempt at transmitting the feedback message. The one or more processors are configured to perform one of transmitting the feedback message before the counter satisfies a count threshold, or discarding the feedback message in connection with the counter satisfying the count threshold.

In some aspects, a base station for wireless communication includes a memory and one or more processors coupled with the memory, the one or more processors configured to transmit, to a UE in a radio resource control message, an indication of a count threshold for a counter that the UE is to use for attempting to transmit a feedback message after failing to transmit the feedback message at a time for which the feedback message was scheduled for transmission, and schedule a time to receive the feedback message.

In some aspects, a non-transitory computer-readable medium storing a set of instructions for wireless communication includes one or more instructions that, when executed by one or more processors of a UE, cause the UE to start a timer in connection with failing to transmit a feedback message at a time for which the feedback message is scheduled for transmission, defer transmission of the feedback message for one or more attempts at transmitting the feedback message, and perform one of: transmitting the feedback message before expiration of the timer, or discarding the feedback message after expiration of the timer.

In some aspects, a non-transitory computer-readable medium storing a set of instructions for wireless communication includes one or more instructions that, when executed by one or more processors of a base station, cause the base station to transmit, to a UE in a radio resource control message, an indication of a duration for a timer that the UE is to use for attempting to transmit a feedback message after failing to transmit the feedback message at a time for which the feedback message is scheduled for transmission, and schedule a time to receive the feedback message.

In some aspects, a non-transitory computer-readable medium storing a set of instructions for wireless communication includes one or more instructions that, when executed by one or more processors of an UE, cause the UE to start a counter in connection with failing to transmit a feedback message at a time for which the feedback message is scheduled for transmission, defer transmission of the feedback message for one or more attempts at transmitting the feedback message, increment the counter after each unsuccessful attempt at transmitting the feedback message, and perform one of: transmitting the feedback message before the counter satisfies a count threshold, or discarding the feedback message in connection with the counter satisfying the count threshold.

In some aspects, a non-transitory computer-readable medium storing a set of instructions for wireless communication includes one or more instructions that, when executed by one or more processors of a base station, cause the base station to transmit, to a UE in a radio resource control message, an indication of a count threshold for a counter that the UE is to use for attempting to transmit a feedback message after failing to transmit the feedback message at a time for which the feedback message was scheduled for transmission, and schedule a time to receive the feedback message.

In some aspects, an apparatus for wireless communication includes means for starting a timer in connection with failing to transmit a feedback message at a time for which the feedback message is scheduled for transmission, means for deferring transmission of the feedback message for one or more attempts at transmitting the feedback message, and means for performing one of: transmitting the feedback message before expiration of the timer, or discarding the feedback message after expiration of the timer.

In some aspects, an apparatus for wireless communication includes means for transmitting, to a UE in a radio resource control message, an indication of a duration for a timer that the UE is to use for attempting to transmit a feedback message after failing to transmit the feedback message at a time for which the feedback message is scheduled for transmission, and means for scheduling a time to receive the feedback message.

In some aspects, an apparatus for wireless communication includes means for starting a counter in connection with failing to transmit a feedback message at a time for which the feedback message is scheduled for transmission, means for deferring transmission of the feedback message for one or more attempts at transmitting the feedback message, means for incrementing the counter after each unsuccessful attempt at transmitting the feedback message, and means for performing one of: transmitting the feedback message before the counter satisfies a count threshold, or discarding the feedback message in connection with the counter satisfying the count threshold.

In some aspects, an apparatus for wireless communication includes means for transmitting, to a UE in a radio resource control message, an indication of a count threshold for a counter that the UE is to use for attempting to transmit a feedback message after failing to transmit the feedback message at a time for which the feedback message was scheduled for transmission, and means for scheduling a time to receive the feedback message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
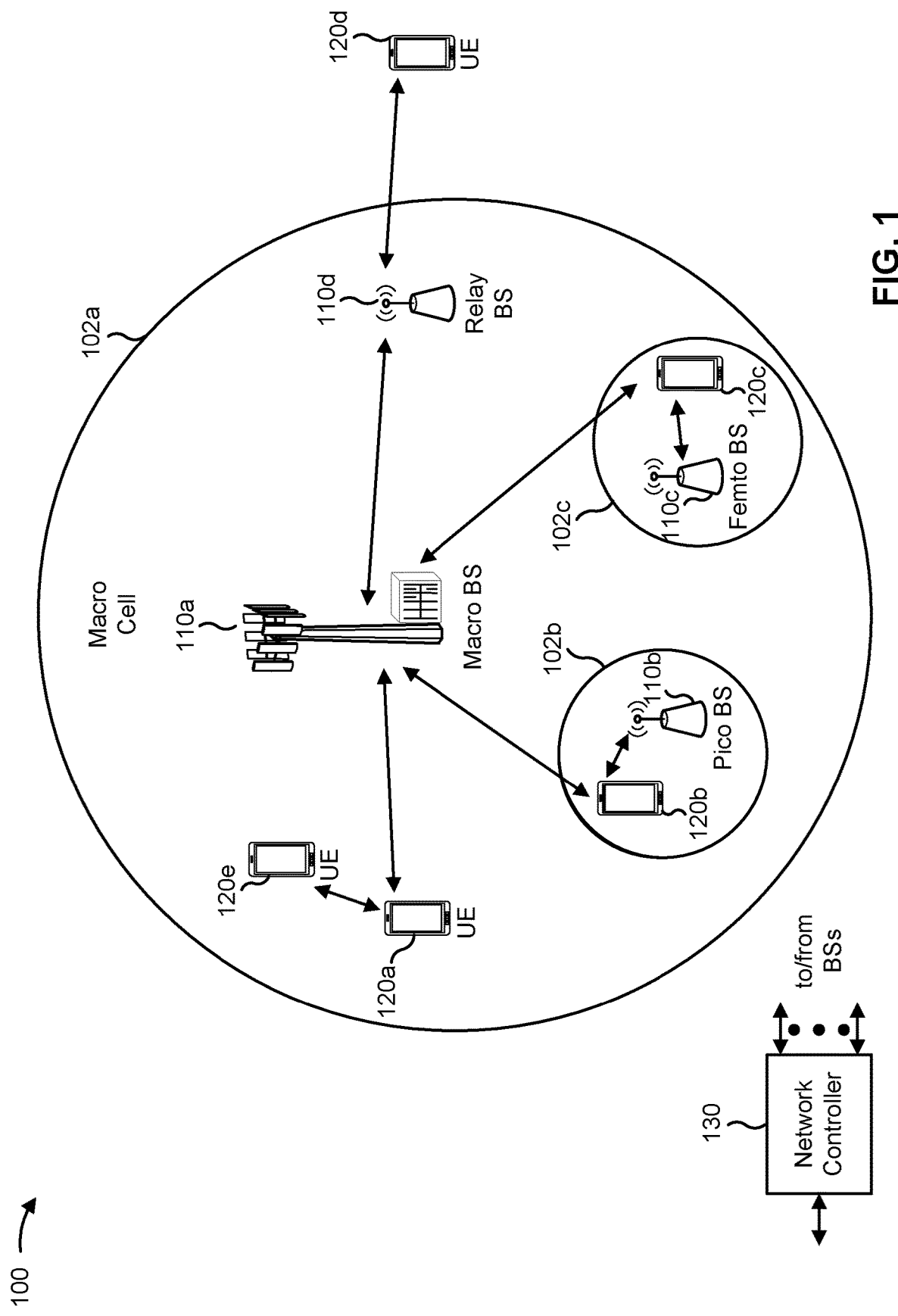
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
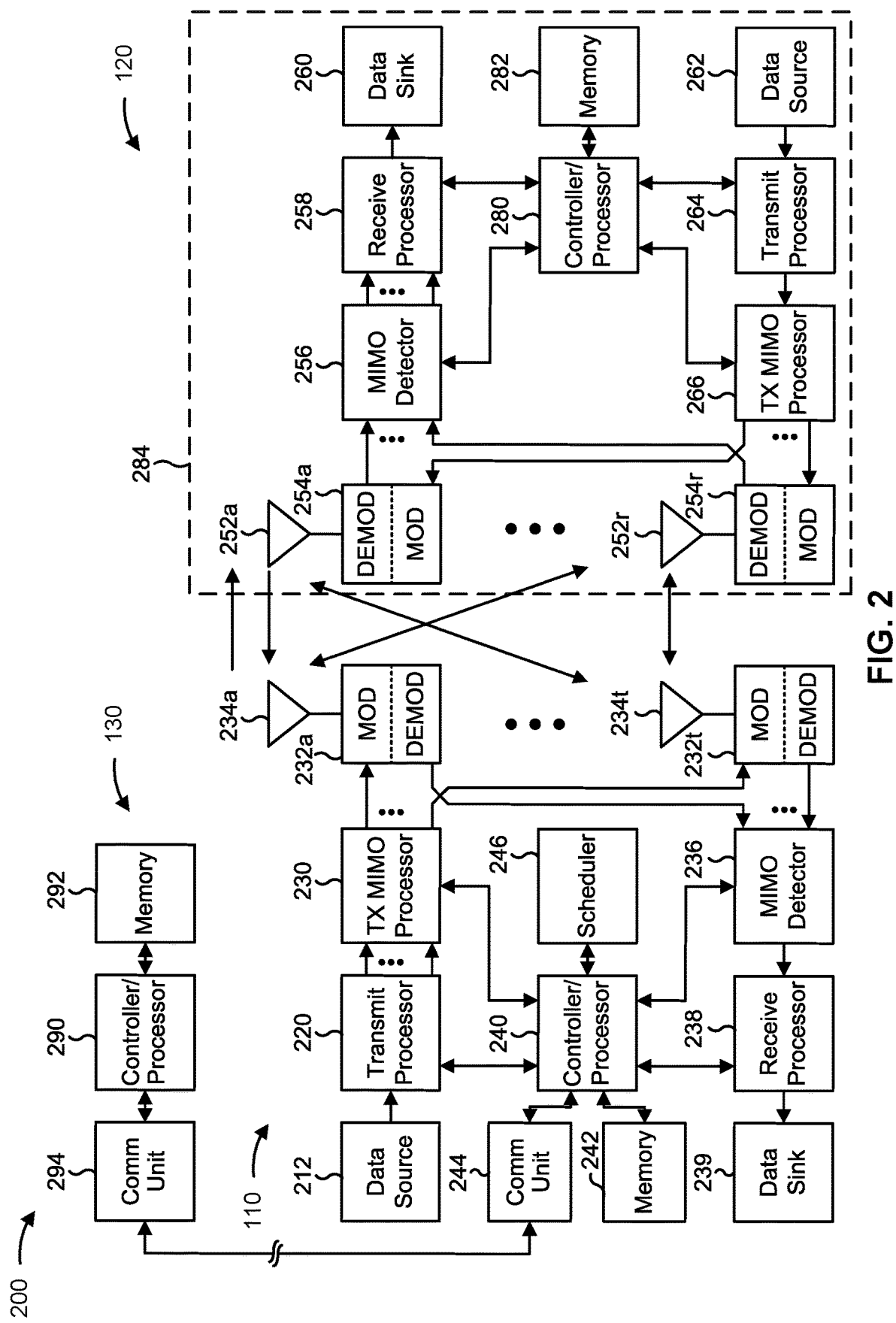
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to Tmodulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-14).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-14).

Controller/processor 240 of base station 110, controller/processor 280 of UE 120, and/or any other component(s) of FIG. 2 may perform one or more techniques associated with limits for retransmission of dropped feedback, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 700 of FIG. 7, process 800 of FIG. 8, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 includes means for starting a timer (e.g., retransmission timer) in connection with failing to transmit a feedback message at a time for which the feedback message is scheduled for transmission, means for deferring transmission of the feedback message for one or more attempts at transmitting the feedback message, and/or means for performing one of: transmitting the feedback message before expiration of the timer, or discarding the feedback message after expiration of the timer. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for configuring a duration of the timer in connection with receiving an indication of the duration from a base station in a radio resource control (RRC) message.

In some aspects, base station 110 includes means for transmitting, to a UE in an RRC message, an indication of a duration for a retransmission timer that the UE is to use for attempting to transmit a feedback message after failing to transmit the feedback message at a time for which the feedback message is scheduled for transmission, and/or means for scheduling a time to receive the feedback message. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, UE 120 includes means for starting a counter (e.g., retransmission counter) in connection with failing to transmit a feedback message at a time for which the feedback message is scheduled for transmission, means for deferring transmission of the feedback message for one or more attempts at transmitting the feedback message, means for incrementing the counter after each unsuccessful attempt at transmitting the feedback message, and/or means for performing one of: transmitting the feedback message before the counter satisfies a count threshold, or discarding the feedback message in connection with the counter satisfying the count threshold. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for configuring the count threshold for the counter in connection with receiving an indication of the count threshold from a base station in an RRC message.

In some aspects, base station 110 includes means for transmitting, to a UE in an RRC message, an indication of a count threshold for a counter that the UE is to use for attempting to transmit a feedback message after failing to transmit the feedback message at a time for which the feedback message was scheduled for transmission, and/or means for scheduling a time to receive the feedback message. The means for base station 110 to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may provide hybrid automatic repeat request (HARQ) feedback for a downlink communication. For example, a UE may transmit a HARQ acknowledgement (HARQ-ACK) to a base station after successfully receiving and decoding a downlink communication on a physical downlink shared channel (PDSCH), or transmit a HARQ negative acknowledgement (HARQ-NACK) after unsuccessfully receiving and/or unsuccessfully decoding a downlink communication. However, while a UE may have scheduled a time for transmission of a feedback message, the UE may have failed to transmit the feedback message at the scheduled time (feedback message dropped). The feedback message may have failed because time domain resources scheduled for transmitting the feedback message may have overlapped with time domain resources needed for transmitting or receiving a message with a higher priority than the feedback message. If the feedback message is dropped, the UE may buffer the feedback message and attempt to retransmit the feedback message. However, the UE may again fail to transmit the feedback message in later attempts. The UE may continue, without end, to attempt retransmissions of the feedback message. The UE may also accumulate other dropped feedback messages and attempt to transmit those feedback messages, causing more scheduling collisions. As a result, the UE wastes power, processing resources, and signaling resources.

According to various aspects described herein, a UE may limit retransmission of a dropped feedback message. For example, the UE may start a timer (e.g., retransmission timer) after a feedback message is dropped. The UE may defer transmission of the feedback message and discard the feedback message if the UE does not transmit the feedback message before expiration of the timer. The UE may buffer the feedback message to defer transmission of the feedback message. Alternatively, the UE may start a counter after the feedback message is dropped. The UE may defer transmission of (e.g., buffer) the feedback message and attempt to retransmit the buffered feedback message. The UE may discard the feedback message if the UE reaches a certain count of attempts without successfully transmitting the buffered feedback message. As a result, the UE may conserve power, processing resource, and signaling resources by not retaining buffered feedback messages unnecessarily and not continuing to attempt to transmit the feedback message unnecessarily.

Figure 3:
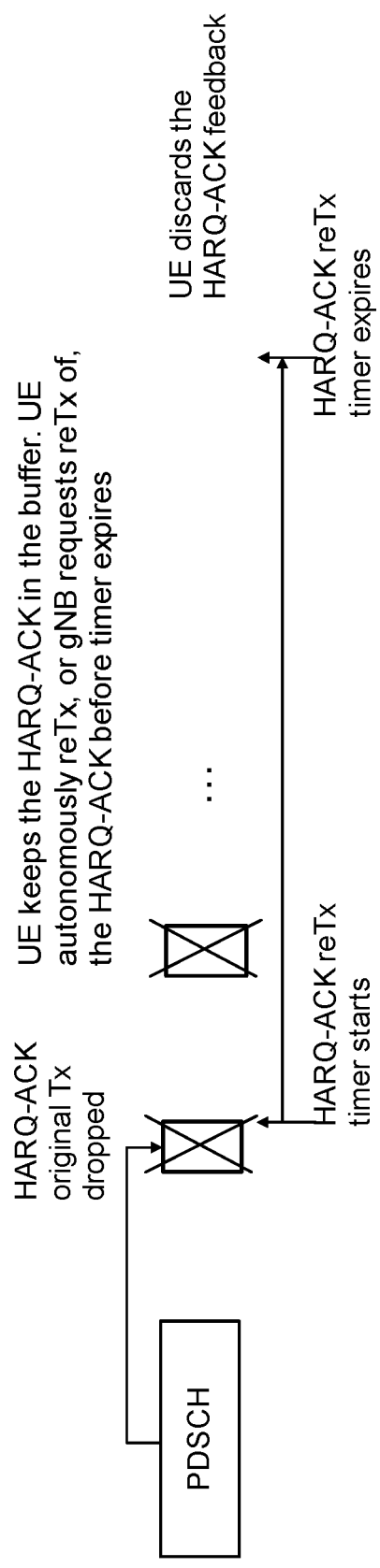
FIG. 3 is a diagram illustrating an example of a limit for retransmission of a dropped feedback message involving a timer, in accordance with the present disclosure.

FIG. 3 is a diagram illustrating an example 300 of a limit for retransmission of a dropped feedback message involving a timer, in accordance with the present disclosure.

A UE may use a timer to limit retransmission of a dropped feedback message. For example, as shown by example 300, the UE may start a timer (e.g., retransmission (reTx) timer) after dropping a feedback message for a downlink communication. The timer may start at an end of a scheduled time (slot) for transmitting the feedback message. The UE may defer transmission of the feedback message, such as by buffering the feedback message, and autonomously (or at the request of a base station) attempt to transmit the feedback message. If the UE does not transmit the feedback message before the timer expires, the UE may discard the feedback message.

As indicated above, FIG. 3 is provided as an example. Other examples may differ from what is described with regard to FIG. 3.

Figure 4:
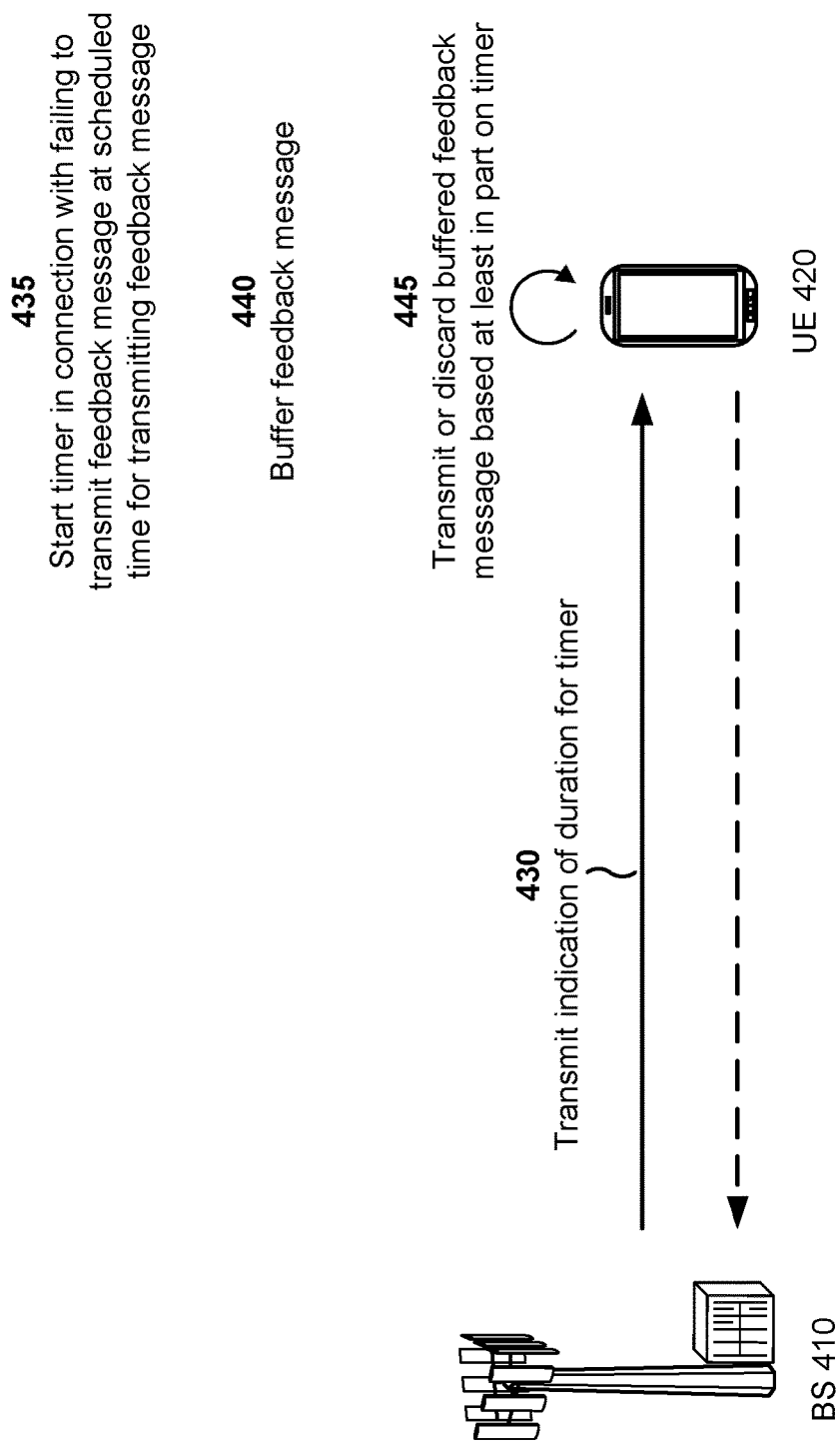
FIG. 4 is a diagram illustrating an example of a limit for retransmission of a dropped feedback message involving a timer, in accordance with the present disclosure.

FIG. 4 is a diagram illustrating an example 400 of a limit for retransmission of a dropped feedback message involving a timer, in accordance with the present disclosure. As shown in FIG. 4, example 400 includes communication between BS 410 (e.g., a BS 110 depicted in FIGS. 1 and 2) and a UE 420 (e.g., a UE 120 depicted in FIGS. 1 and 2). In some aspects, BS 410 and UE 420 may be included in a wireless network, such as wireless network 100. BS 410 and UE 420 may communicate on a wireless access link, which may include an uplink and a downlink.

BS 410 may configure UE 420 to use a timer (e.g., retransmission timer) for feedback messages. As shown by reference number 430, BS 410 may transmit an indication of a duration for the timer, or a maximum deferral time. The duration may be based at least in part on a history of feedback messages, a UE capability, and/or channel conditions, among other factors. The indication may be sent in an RRC message or another message type.

UE 420 may prepare to transmit a feedback message (e.g., HARQ-ACK) at a scheduled time in connection with successfully receiving and decoding a downlink communication from BS 410 on a PDSCH. However, the feedback message may be dropped due to overlapping resources or for another reason. For example, UE 420 may have refrained from transmitting the feedback message in order to transmit or receive a communication with a higher priority than the feedback message. As shown by reference number 435, UE 420 may start the timer in connection with failing to transmit the feedback message at the scheduled time. Each HARQ process may have a timer.

UE 420 may defer transmission of the feedback message in order to attempt to transmit the feedback message. For example, as shown by reference number 440, UE 420 may buffer the feedback message in order to attempt to transmit the buffered feedback message. As shown by reference number 445, UE 420 may transmit or discard the buffered feedback message. For example, UE 420 may be successful in transmitting the feedback message before expiration of the timer. However, if UE 420 makes one or more unsuccessful attempts and fails to transmit the buffered feedback message before expiration of the timer, UE 420 may discard the buffered feedback message. As a result, UE 420 has more available resources for other communications.

As indicated above, FIG. 4 is provided as an example. Other examples may differ from what is described with regard to FIG. 4.

Figure 5:
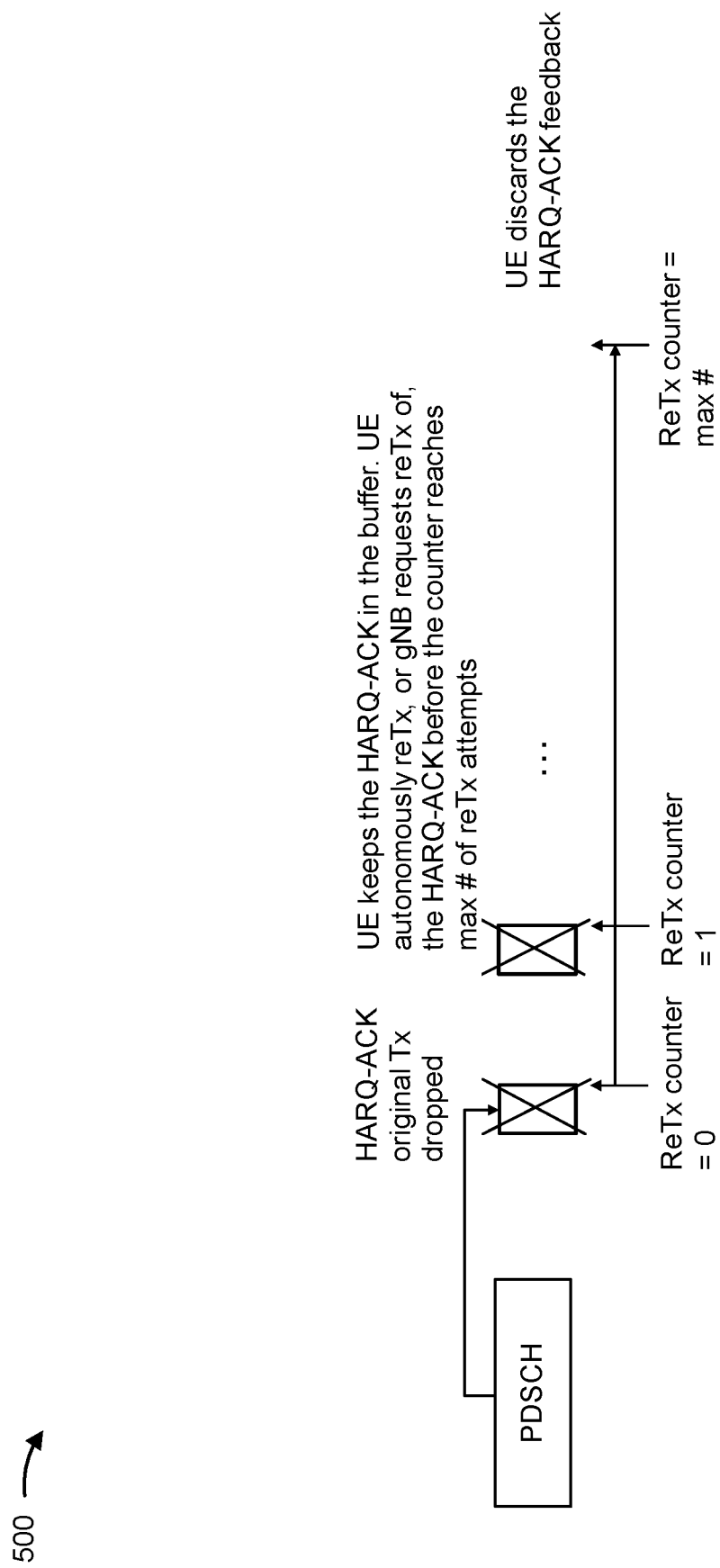
FIG. 5 is a diagram illustrating an example of a limit for retransmission of a dropped feedback message involving a counter, in accordance with the present disclosure.

FIG. 5 is a diagram illustrating an example 500 of a limit for retransmission of a dropped feedback message involving a counter, in accordance with the present disclosure.

A UE may use a counter to limit retransmission of a dropped feedback message. For example, as shown by example 500, the UE may start a counter (e.g., retransmission counter) after dropping a feedback message for a downlink communication. The UE may defer transmission of the feedback message and attempt to retransmit the feedback message one or more times. The UE may defer transmission of the feedback message by buffering the feedback message. The UE may increment the counter with each attempt. If the UE does not transmit the feedback message before the counter satisfies a count threshold (e.g., maximum quantity of attempts), the UE may discard the feedback message.

As indicated above, FIG. 5 is provided as an example. Other examples may differ from what is described with regard to FIG. 5.

Figure 6:
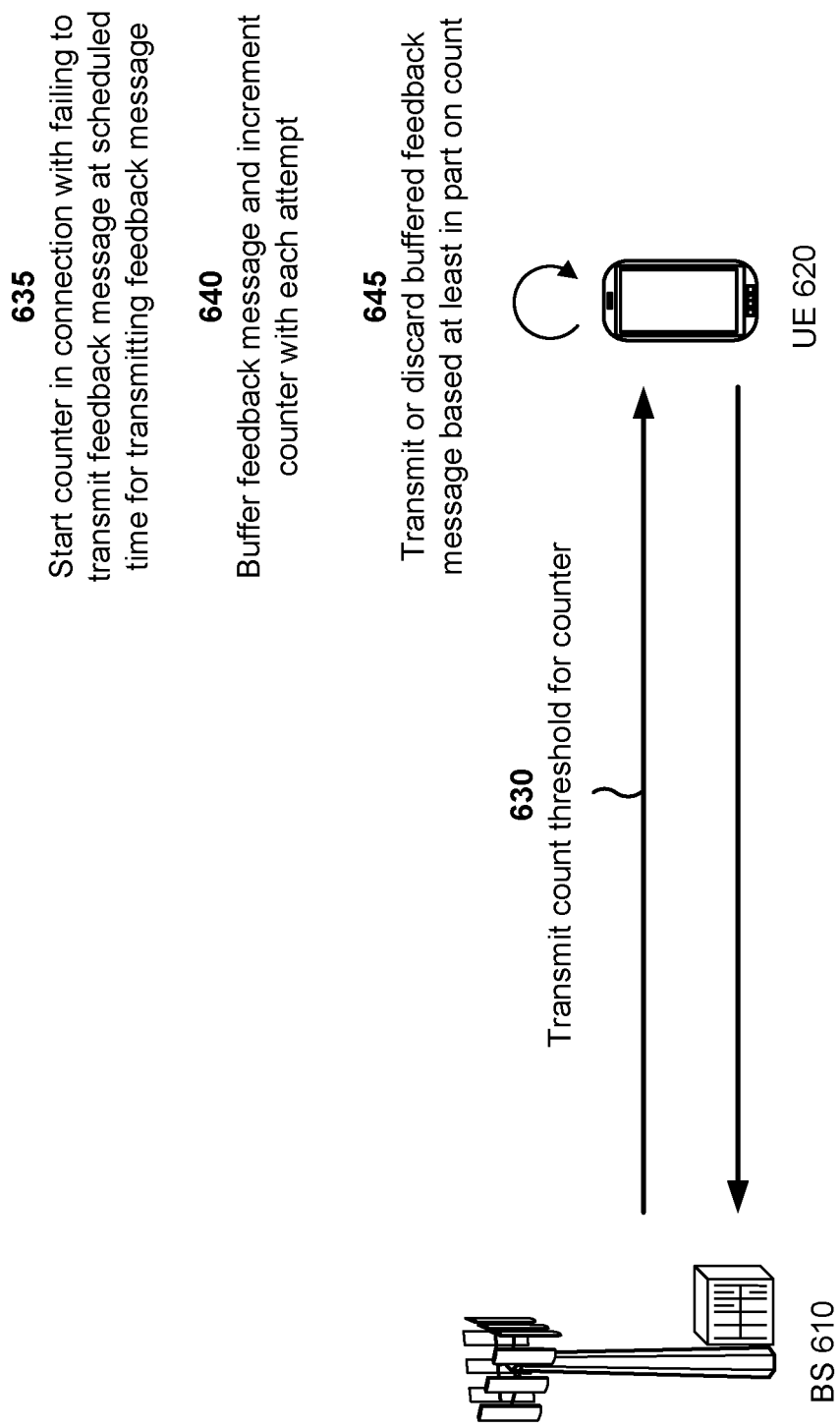
FIG. 6 is a diagram illustrating an example of a limit for retransmission of a dropped feedback message involving a counter, in accordance with the present disclosure.

FIG. 6 is a diagram illustrating an example 600 of a limit for retransmission of a dropped feedback message involving a counter, in accordance with the present disclosure. As shown in FIG. 6, example 600 includes communication between BS 610 (e.g., a BS 110 depicted in FIGS. 1 and 2) and a UE 620 (e.g., a UE 120 depicted in FIGS. 1 and 2). In some aspects, BS 610 and UE 620 may be included in a wireless network, such as wireless network 100. BS 610 and UE 620 may communicate on a wireless access link, which may include an uplink and a downlink.

BS 610 may configure UE 620 to use a counter (e.g., retransmission counter) for feedback messages. As shown by reference number 630, BS 610 may transmit an indication of a count threshold (e.g., maximum count) for the counter. The count threshold may be based at least in part on a history of feedback messages, a UE capability, and/or channel conditions, among other factors. The indication may be sent in an RRC message or another message type.

UE 620 may prepare to transmit a feedback message (e.g., HARQ-ACK) at a scheduled time in connection with successfully receiving and decoding a downlink communication from BS 610 on a PDSCH. However, the feedback message may be dropped due to overlapping resources or for another reason. As shown by reference number 635, UE 620 may start (and/or reset, if necessary) the counter in connection with failing to transmit the feedback message at the scheduled time. Each HARQ process may have a counter.

UE 620 may defer transmission of the feedback message in order to attempt to transmit the feedback message. For example, as shown by reference number 640, UE 620 may buffer the feedback message in order to attempt to transmit the buffered feedback message. UE 620 may increment the counter with each attempt at transmitting the buffered feedback message. A failed attempt may include scheduling the feedback message for transmission and then failing to transmit the message at the scheduled time. As shown by reference number 645, UE 620 may transmit or discard the buffered feedback message. More specifically, UE 620 may be successful in transmitting the feedback message before the counter satisfies the count threshold (e.g., maximum count). However, if UE 620 makes unsuccessful attempts and fails to transmit the buffered feedback message before reaching the count threshold, UE 620 may discard the buffered feedback message. As a result, UE 620 has more available resources for other communications.

As indicated above, FIG. 6 is provided as an example. Other examples may differ from what is described with regard to FIG. 6.

Figure 7:
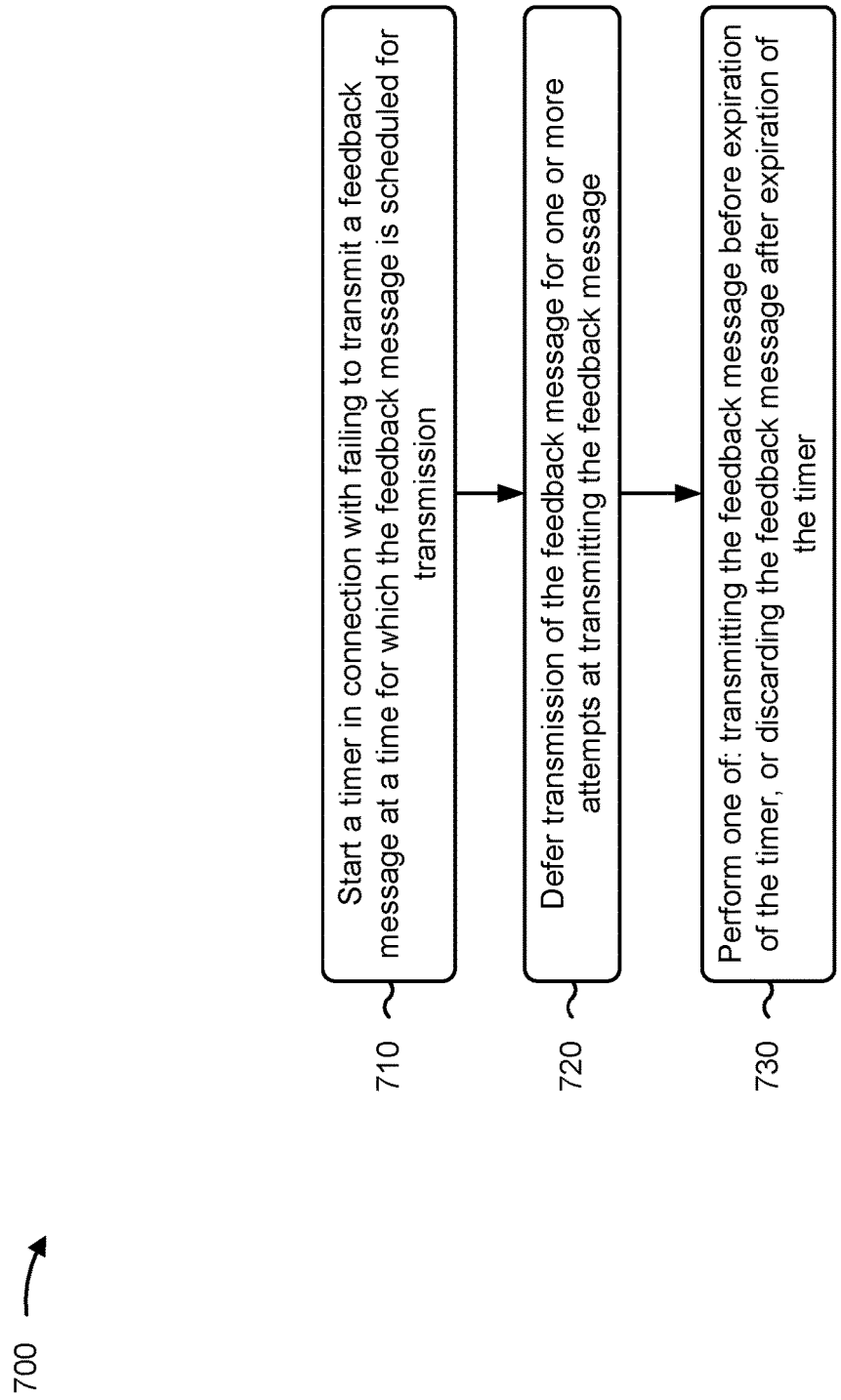
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., a UE 120 depicted in FIGS. 1-2, UE 420 depicted in FIG. 4) performs operations associated with a limit for retransmission of dropped feedback.

As shown in FIG. 7, in some aspects, process 700 may include starting a timer in connection with failing to transmit a feedback message at a time for which the feedback message is scheduled for transmission (block 710). For example, the UE (e.g., using timer component 1108 depicted in FIG. 11) may start a timer in connection with failing to transmit a feedback message at a time for which the feedback message is scheduled for transmission, as described above.

As further shown in FIG. 7, in some aspects, process 700 may include deferring transmission of the feedback message for one or more attempts at transmitting the feedback message (block 720). For example, the UE (e.g., using buffer component 1110 depicted in FIG. 11) may defer transmission of the feedback message for one or more attempts at transmitting the feedback message, as described above.

As further shown in FIG. 7, in some aspects, process 700 may include performing one of: transmitting the feedback message before expiration of the timer, or discarding the feedback message after expiration of the timer (block 730). For example, the UE (e.g., using performing component 1112, transmission component 1104, timer component 1108, and/or buffer component 1110 depicted in FIG. 11) may perform one of: transmitting the feedback message before expiration of the timer, or discarding the feedback message after expiration of the timer, as described above.

Process 700 may include additional aspects, such as any single aspect or any combination of aspects described below and/or in connection with one or more other processes described elsewhere herein.

In a first aspect, the feedback message is a HARQ ACK or a HARQ NACK.

In a second aspect, alone or in combination with the first aspect, failing to transmit the feedback message includes refraining from transmitting the feedback message based at least in part on determining that a higher priority uplink communication is to be transmitted at a time for which the feedback message is scheduled for transmission.

In a third aspect, alone or in combination with one or more of the first and second aspects, failing to transmit the feedback message includes refraining from transmitting the feedback message based at least in part on determining that a higher priority downlink communication is to be received at a time for which the feedback message is scheduled for transmission.

In a fourth aspect, alone or in combination with one or more of the first through third aspects, process 700 includes configuring a duration of the timer in connection with receiving an indication of the duration from a base station in an RRC message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
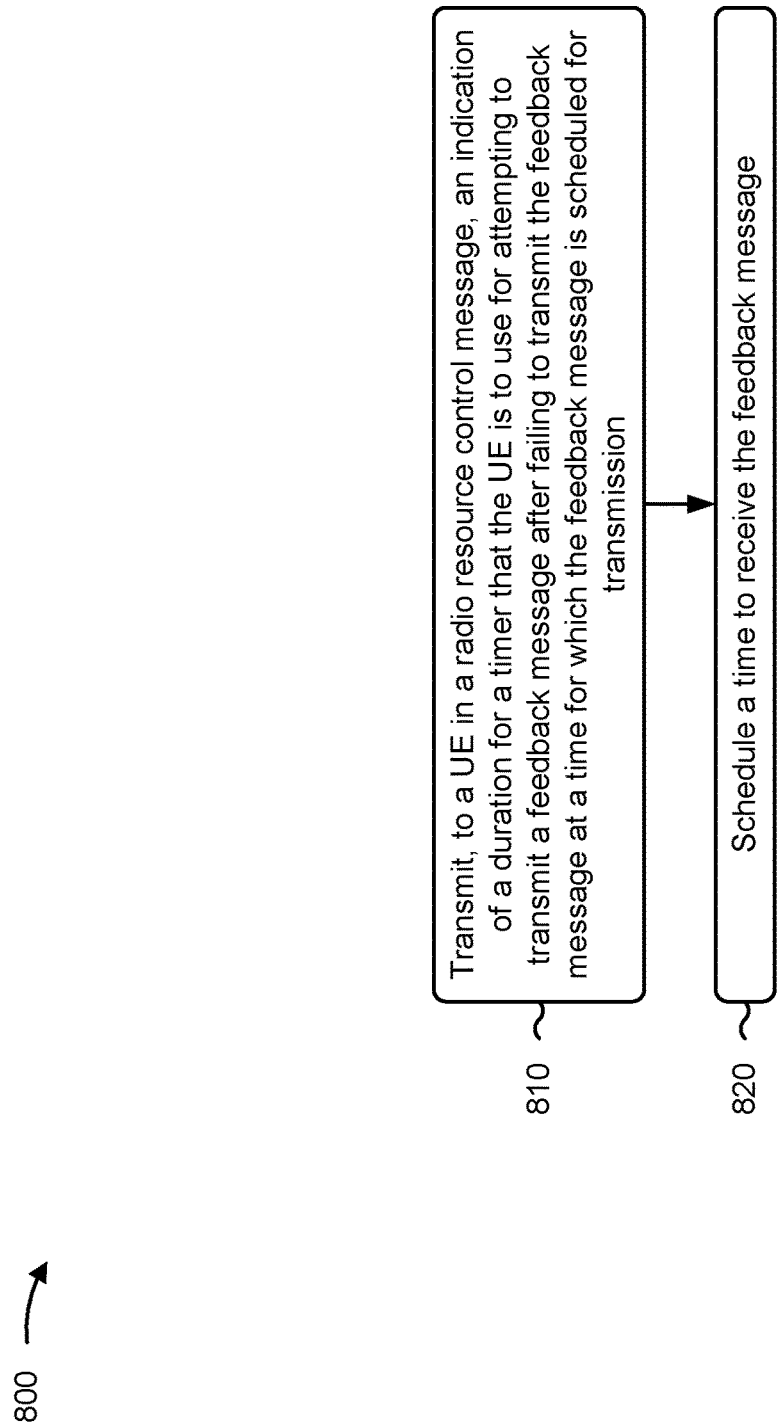
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 depicted in FIGS. 1-2, BS 410 depicted in FIG. 4) performs operations associated with a limit for retransmission of dropped feedback.

As shown in FIG. 8, in some aspects, process 800 may include transmitting, to a UE in an RRC message, an indication of a duration for a timer that the UE is to use for attempting to transmit a feedback message after failing to transmit the feedback message at a time for which the feedback message is scheduled for transmission (block 810). For example, the base station (e.g., using transmission component 1204 depicted in FIG. 12) may transmit, to a UE in an RRC message, an indication of a duration for a timer that the UE is to use for attempting to transmit a feedback message after failing to transmit the feedback message at a time for which the feedback message is scheduled for transmission, as described above.

As further shown in FIG. 8, in some aspects, process 800 may include scheduling a time to receive the feedback message (block 820). For example, the base station (e.g., using schedule component 1208 depicted in FIG. 12) may schedule a time to receive the feedback message, as described above.

Process 800 may include additional aspects, such as any single aspect or any combination of aspects described below and/or in connection with one or more other processes described elsewhere herein.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
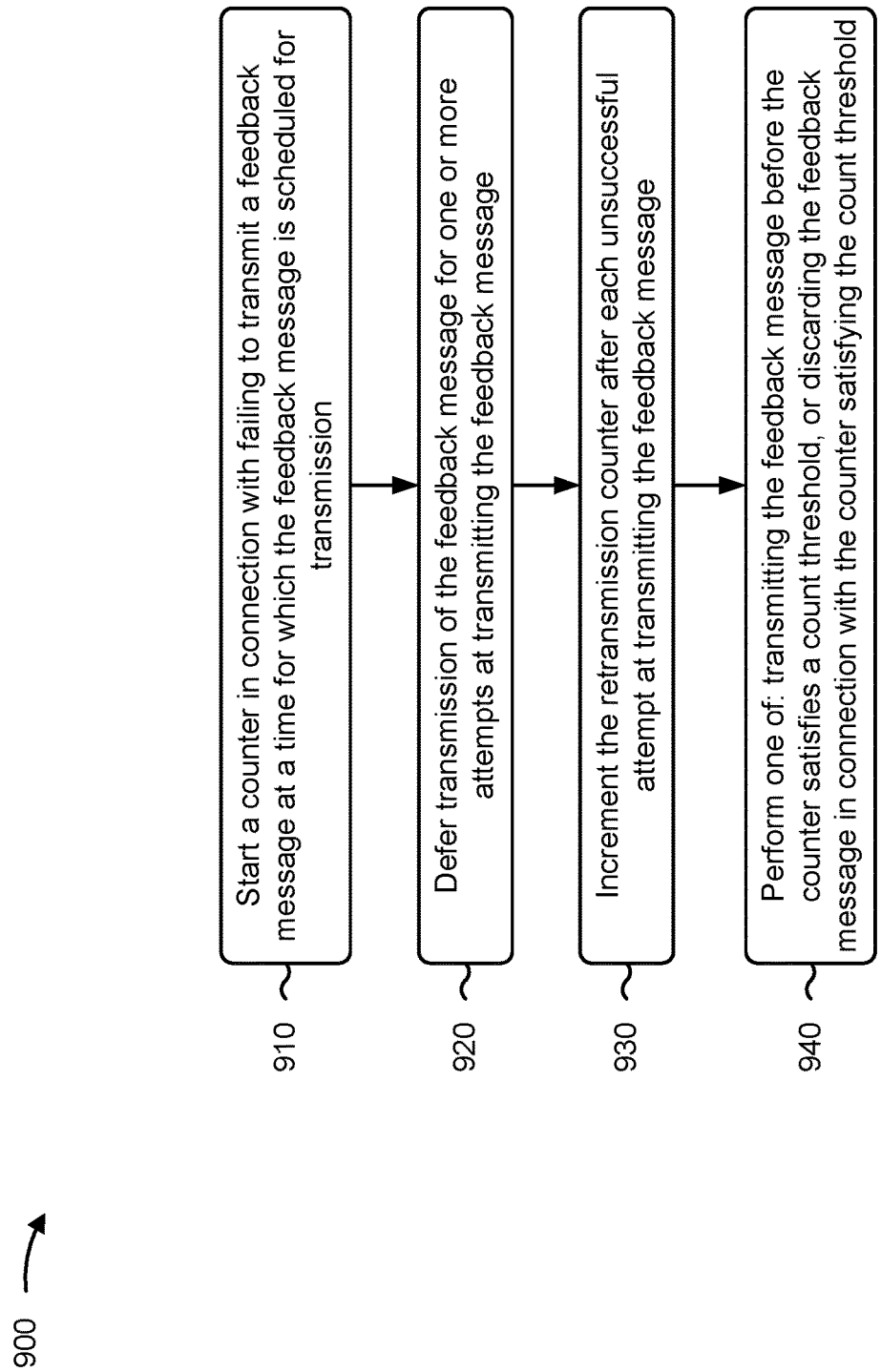
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., a UE 120 depicted in FIGS. 1-2, UE 620 depicted in FIG. 6) performs operations associated with a limit for of dropped feedback.

As shown in FIG. 9, in some aspects, process 900 may include starting a counter in connection with failing to transmit a feedback message at a time for which the feedback message is scheduled for transmission (block 910). For example, the UE (e.g., using counter component 1306 depicted in FIG. 13) may start a counter in connection with failing to transmit a feedback message at a time for which the feedback message is scheduled for transmission, as described above.

As further shown in FIG. 9, in some aspects, process 900 may include deferring transmission of the feedback message for one or more attempts at transmitting the feedback message (block 920). For example, the UE (e.g., using buffer component 1310 depicted in FIG. 13) may defer transmission of the feedback message for one or more attempts at transmitting the feedback message, as described above.

As further shown in FIG. 9, in some aspects, process 900 may include incrementing the counter after each unsuccessful attempt at transmitting the feedback message (block 930). For example, the UE (e.g., using counter component 1308 depicted in FIG. 13) may increment the counter after each unsuccessful attempt at transmitting the feedback message, as described above.

As further shown in FIG. 9, in some aspects, process 900 may include performing one of: transmitting the feedback message before the counter satisfies a count threshold, or discarding the feedback message in connection with the counter satisfying the count threshold (block 940). For example, the UE (e.g., using performing component 1312 depicted in FIG. 13) may perform one of: transmitting the feedback message before the counter satisfies a count threshold, or discarding the feedback message in connection with the counter satisfying the count threshold, as described above.

Process 900 may include additional aspects, such as any single aspect or any combination of aspects described below and/or in connection with one or more other processes described elsewhere herein.

In a first aspect, the feedback message is a HARQ ACK or a HARQ NACK.

In a second aspect, alone or in combination with the first aspect, failing to transmit the feedback message includes refraining from transmitting the feedback message based at least in part on determining that a higher priority uplink communication is to be transmitted at a time for which the feedback message is scheduled for transmission.

In a third aspect, alone or in combination with one or more of the first and second aspects, failing to transmit the feedback message includes refraining from transmitting the feedback message based at least in part on determining that a higher priority downlink communication is to be received at a time for which the feedback message is scheduled for transmission.

In a fourth aspect, alone or in combination with one or more of the first through third aspects, process 900 includes configuring the count threshold for the counter in connection with receiving an indication of the count threshold from a base station in an RRC message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
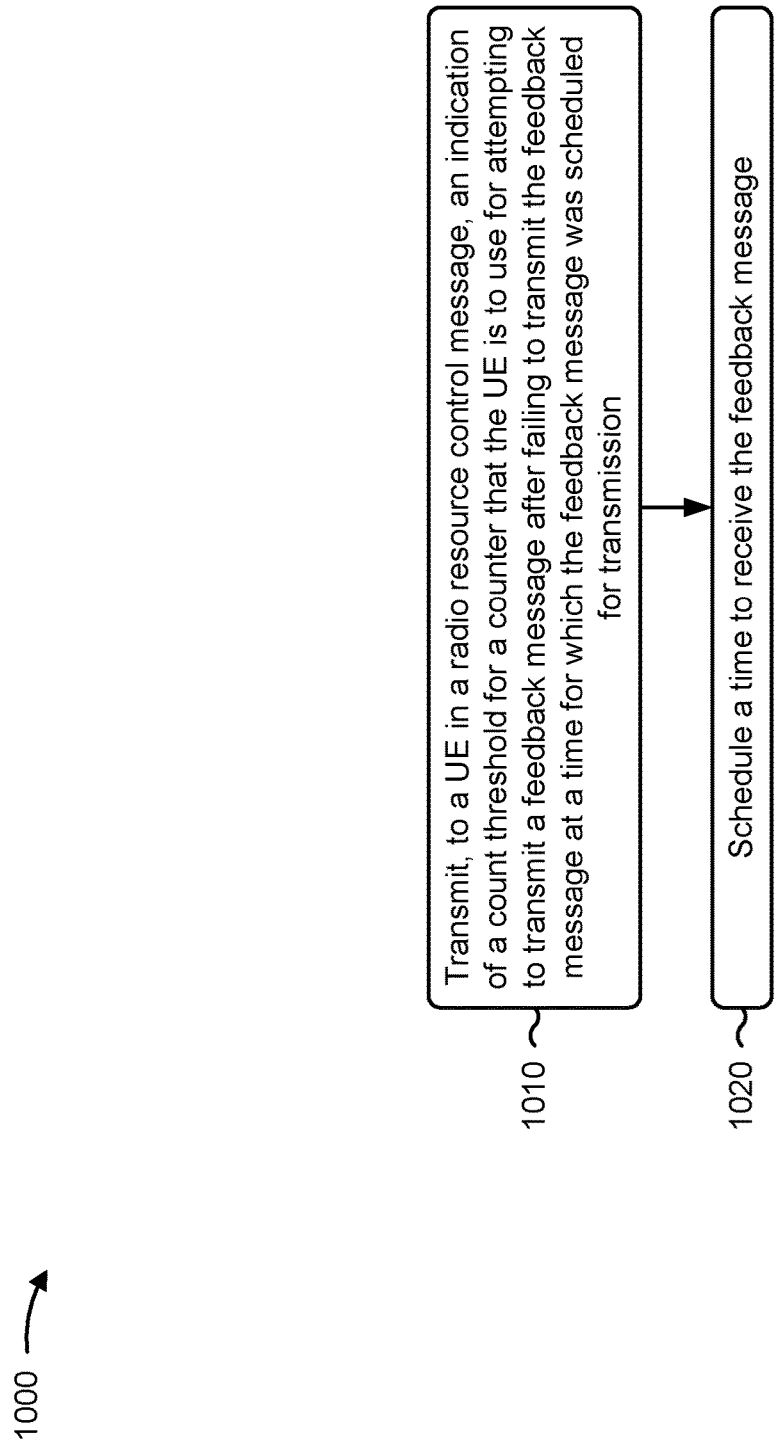
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110) performs operations associated with a limit for retransmission of dropped feedback.

As shown in FIG. 10, in some aspects, process 1000 may include transmitting, to a UE in an RRC message, an indication of a count threshold for a counter that the UE is to use for attempting to transmit a feedback message after failing to transmit the feedback message at a time for which the feedback message was scheduled for transmission (block 1010). For example, the base station (e.g., using transmission component 1404 depicted in FIG. 14) may transmit, to a UE in an RRC message, an indication of a count threshold for a counter that the UE is to use for attempting to transmit a feedback message after failing to transmit the feedback message at a time for which the feedback message was scheduled for transmission, as described above.

As further shown in FIG. 10, in some aspects, process 1000 may include scheduling a time to receive the feedback message (block 1020). For example, the base station (e.g., using schedule component 1408 depicted in FIG. 14) may schedule a time to receive the feedback message, as described above.

Process 1000 may include additional aspects, such as any single aspect or any combination of aspects described below and/or in connection with one or more other processes described elsewhere herein.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
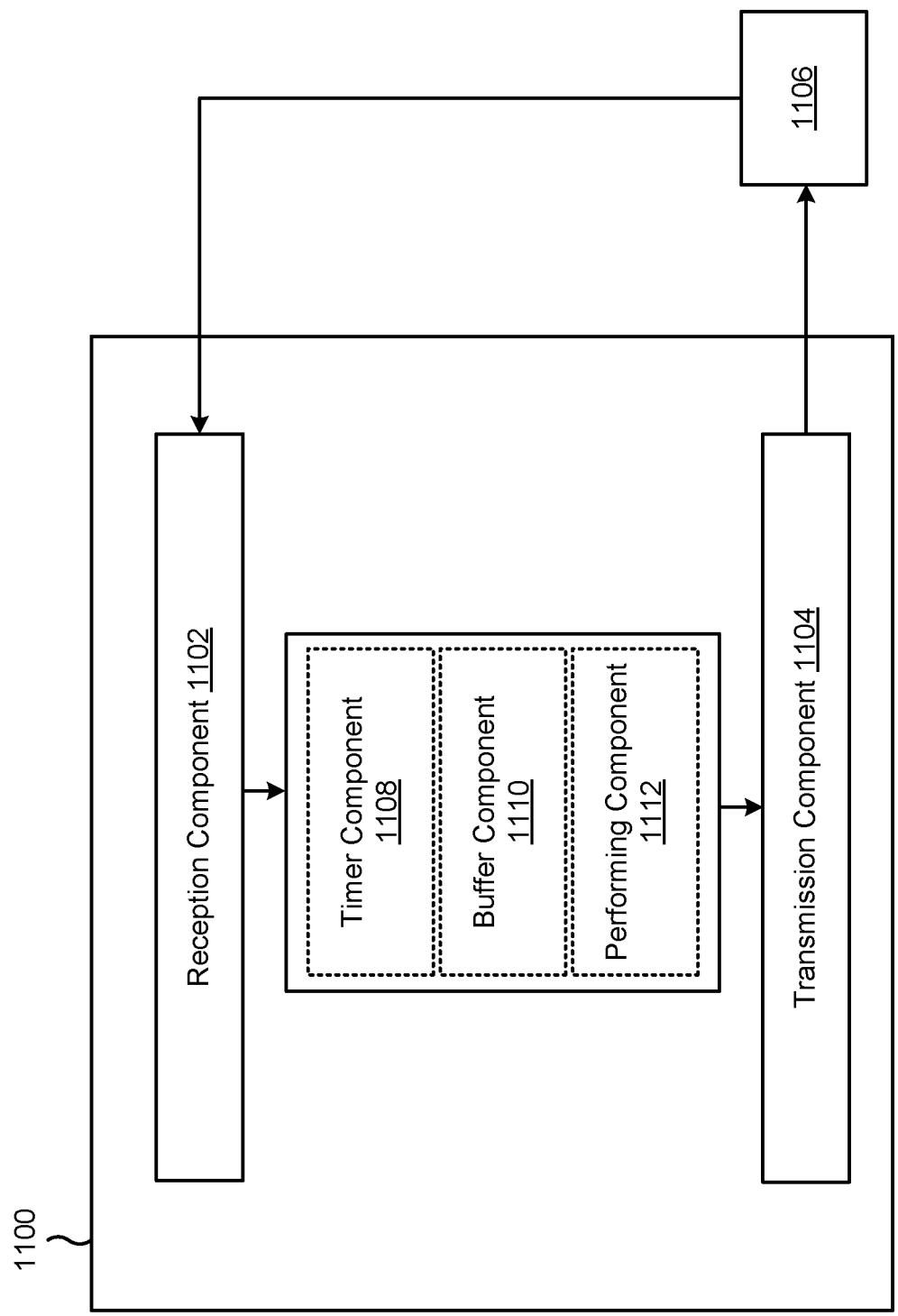
FIGS. 11-14 are block diagrams of example apparatuses for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a timer component 1108, a buffer component 1110, or a performing component 1112, among other examples.

In some aspects, the apparatus 1100 may be configured to perform one or more operations described herein in connection with FIGS. 3-10. Additionally, or alternatively, the apparatus 1100 may be configured to perform one or more processes described herein, such as process 700 of FIG. 7. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be collocated with the reception component 1102 in a transceiver.

The timer component 1108 may start a timer in connection with failing to transmit a feedback message at a time for which the feedback message is scheduled for transmission. In some aspects, the timer component 1108 may include a controller/processor, a memory, or a combination thereof, of the UE described above in connection with FIG. 2. The buffer component 1110 may defer transmission of the feedback message by buffering the feedback message for one or more attempts at transmitting the feedback message. In some aspects, the buffer component 1110 may include a modulator, a transmit MIMO processor, a transmit processor, a controller/processor, a memory, or a combination thereof, of the UE described above in connection with FIG.

2. The performing component 1112 may perform one of: transmitting the buffered feedback message before expiration of the timer, or not transmitting the buffered feedback message before expiration of the timer and discarding the buffered feedback message. In some aspects, the performing component 1112 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The performing component 1112 may employ transmission component 1104, timer component 1108, and/or buffer component 1110.

The timer component 1108 may configure a duration of the timer in connection with receiving an indication of the duration from a base station in a radio resource control message.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
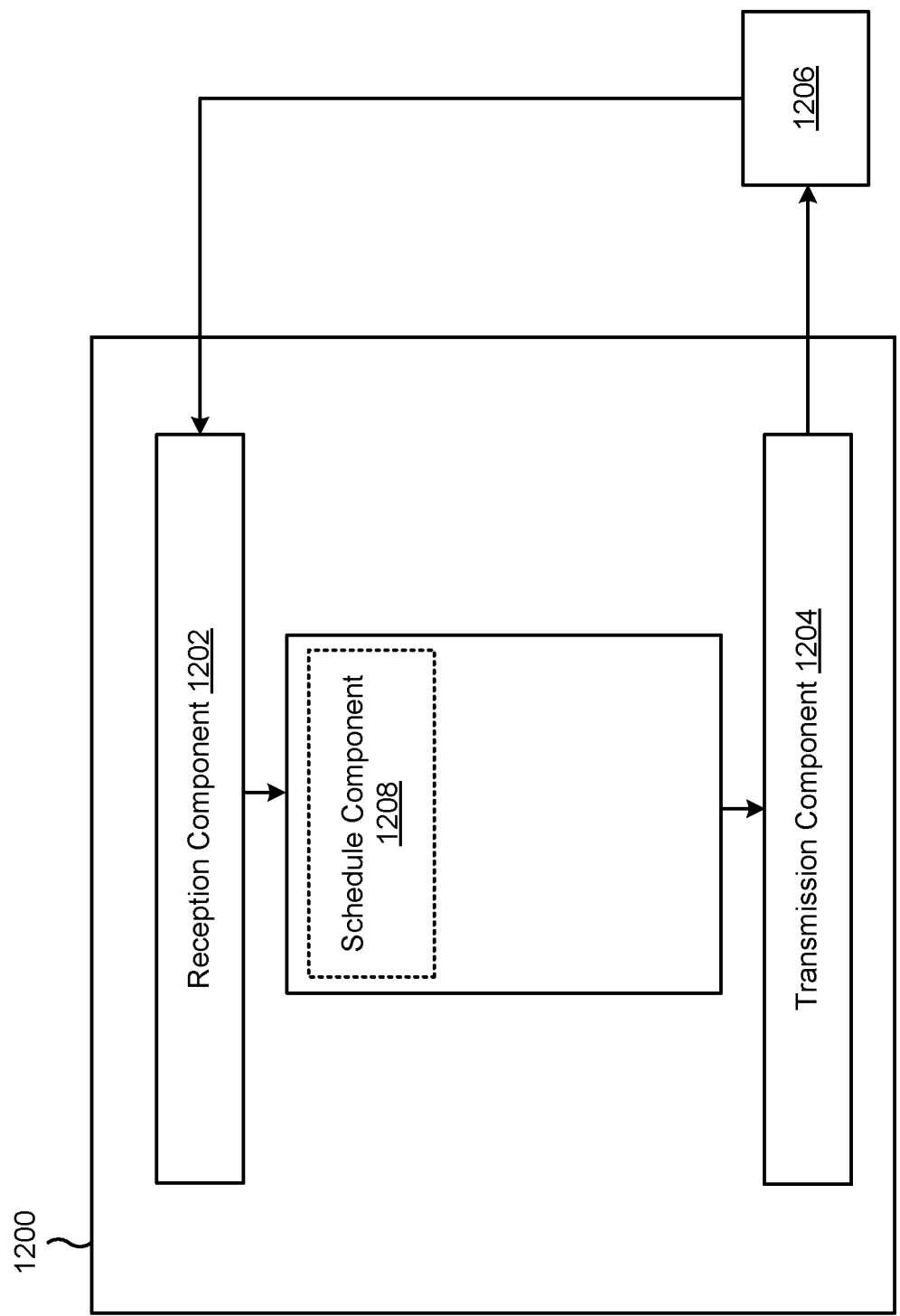

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a schedule component 1208, among other examples.

In some aspects, the apparatus 1200 may be configured to perform one or more operations described herein in connection with FIGS. 3-10. Additionally, or alternatively, the apparatus 1200 may be configured to perform one or more processes described herein, such as process 800 of FIG. 8. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be collocated with the reception component 1202 in a transceiver.

The transmission component 1204 may transmit, to a UE in an RRC message, an indication of a duration for a timer that the UE is to use for attempting to transmit a feedback message after failing to transmit the feedback message at a time for which the feedback message is scheduled for transmission. The schedule component 1208 may schedule a time to receive the feedback message. In some aspects, the schedule component 1208 may include a modulator, a transmit MIMO processor, a transmit processor, a controller/processor, a memory, or a combination thereof, of the base station described above in connection with FIG. 2.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
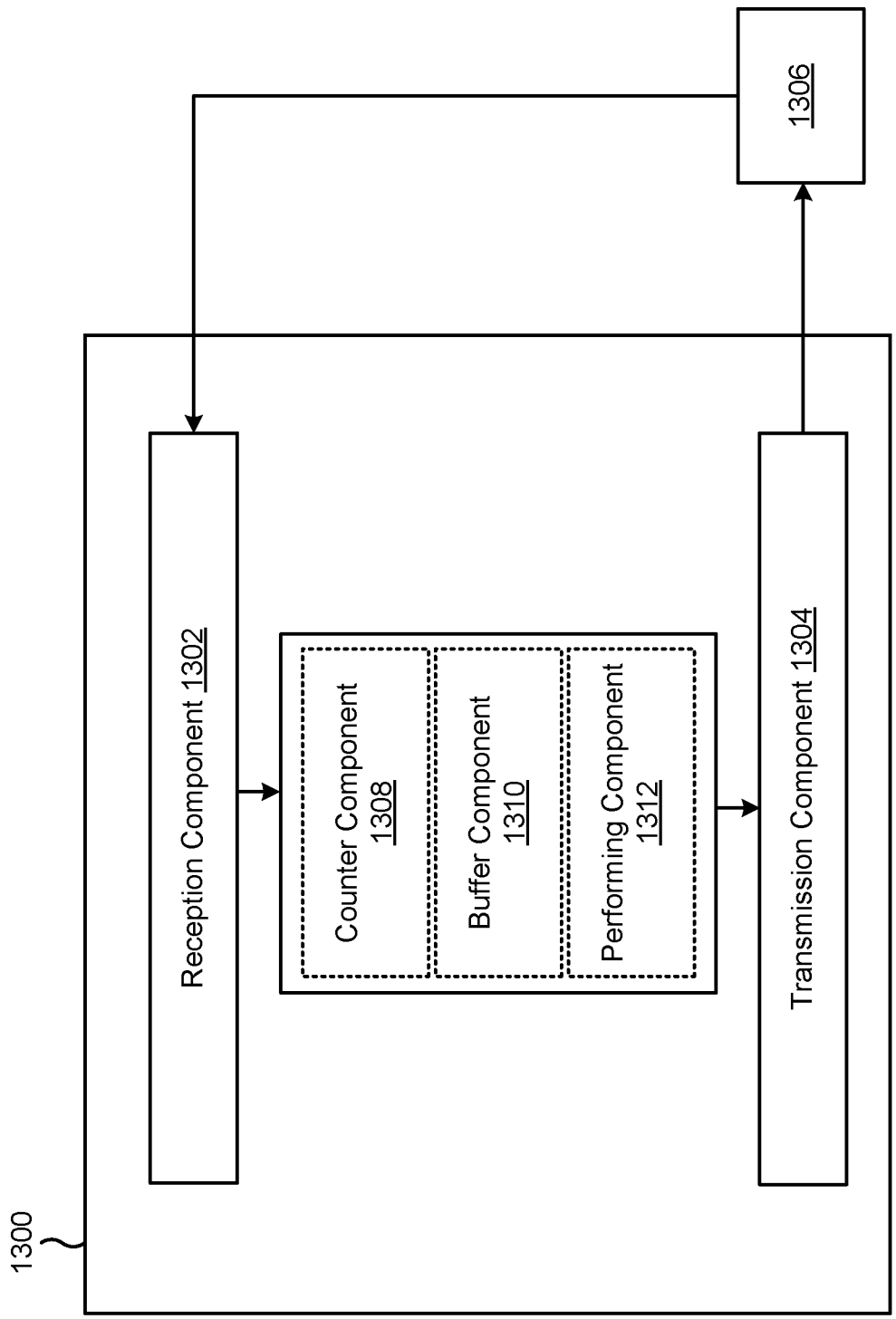

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a counter component 1308, a buffer component 1310, or a performing component 1312, among other examples.

In some aspects, the apparatus 1300 may be configured to perform one or more operations described herein in connection with FIGS. 3-10. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be collocated with the reception component 1302 in a transceiver.

The counter component 1308 may start a counter in connection with failing to transmit a feedback message at a time for which the feedback message is scheduled for transmission. In some aspects, the counter component 1308 may include a controller/processor, a memory, or a combination thereof, of the UE described above in connection with FIG. 2. The buffer component 1310 may defer transmission of the feedback message by buffering the feedback message for one or more attempts at transmitting the feedback message. In some aspects, the buffer component 1310 may include a modulator, a transmit MIMO processor, a transmit processor, a controller/processor, a memory, or a combination thereof, of the UE described above in connection with FIG. 2. The counter component 1308 may increment the counter after each unsuccessful attempt at transmitting the buffered feedback message. The performing component 1312 may perform one of: transmitting the buffered feedback message before the counter satisfies a count threshold, or not transmitting the buffered feedback message before the counter satisfies the count threshold and discarding the buffered feedback message. In some aspects, the performing component 1312 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The performing component may employ the transmission component 1304, the counter component 1308, and/or the buffer component 1310.

The counter component 1308 may configure the count threshold for the counter in connection with receiving an indication of the count threshold from a base station in a radio resource control message.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
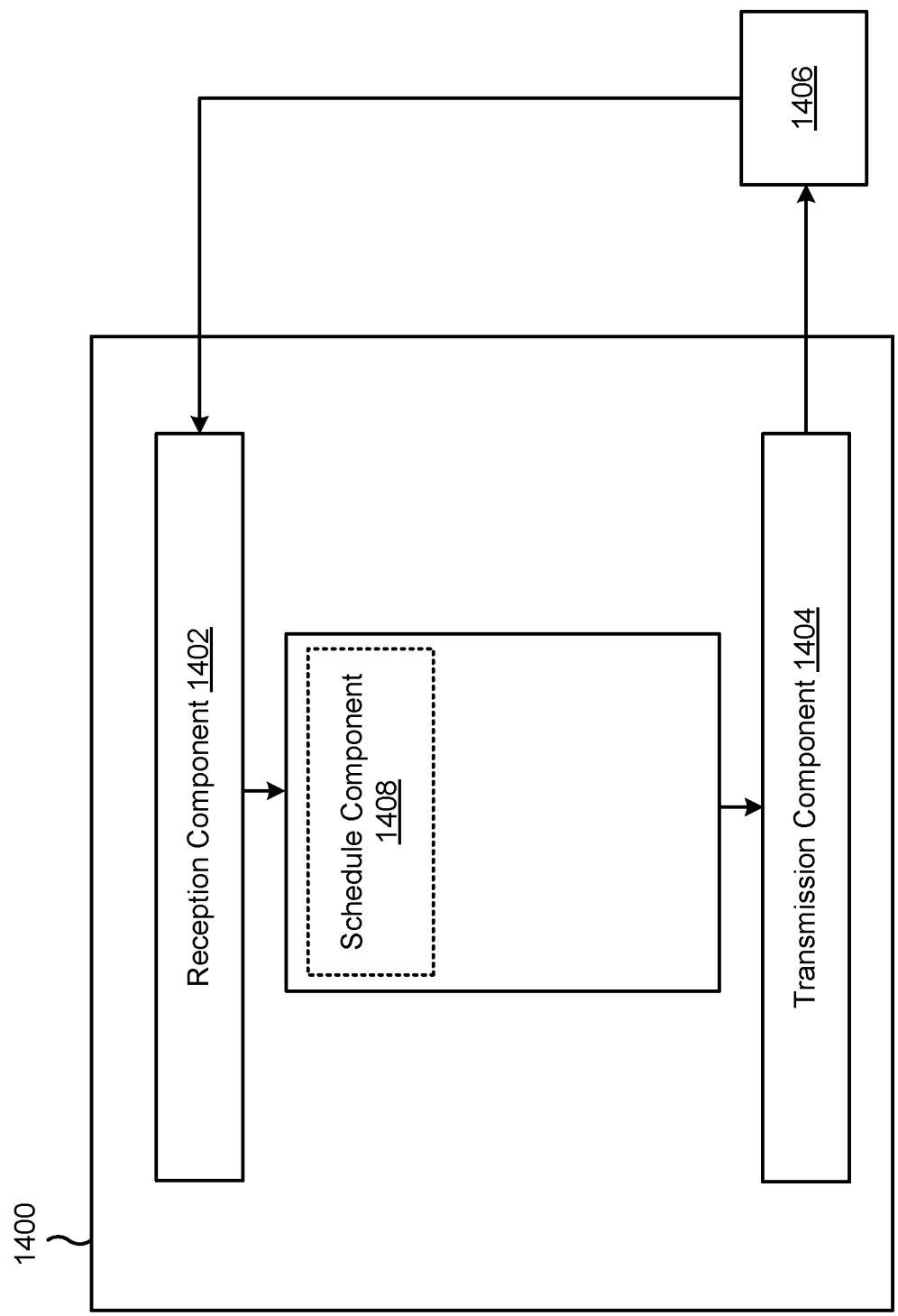

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of a schedule component 1408, among other examples.

In some aspects, the apparatus 1400 may be configured to perform one or more operations described herein in connection with FIGS. 3-10. Additionally, or alternatively, the apparatus 1400 may be configured to perform one or more processes described herein, such as process 1000 of FIG. 10. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be collocated with the reception component 1402 in a transceiver.

The transmission component 1404 may transmit, to a UE in a radio resource control message, an indication of a count threshold for a counter that the UE is to use for attempting to transmit a feedback message after failing to transmit the feedback message at a time for which the feedback message was scheduled for transmission. The schedule component 1408 may schedule a time to receive the feedback message. In some aspects, the schedule component 1408 may include a modulator, a transmit MIMO processor, a transmit processor, a controller/processor, a memory, or a combination thereof, of the base station described above in connection with FIG. 2.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: starting a timer in connection with failing to transmit a feedback message at a time for which the feedback message is scheduled for transmission; deferring transmission of the feedback message for one or more attempts at transmitting the feedback message; and performing one of: transmitting the feedback message before expiration of the timer, or discarding the feedback message after expiration of the timer.

Aspect 2: The method of Aspect 1, wherein the feedback message is a hybrid automatic repeat request (HARQ) acknowledgment or a HARQ negative acknowledgement.

Aspect 3: The method of Aspect 1 or 2, wherein failing to transmit the feedback message includes refraining from transmitting the feedback message based at least in part on determining that a higher priority uplink communication is to be transmitted at a time for which the feedback message is scheduled for transmission.

Aspect 4: The method of Aspect 1 or 2, wherein failing to transmit the feedback message includes refraining from transmitting the feedback message based at least in part on determining that a higher priority downlink communication is to be received at a time for which the feedback message is scheduled for transmission.

Aspect 5: The method of any of Aspects 1-4, further comprising configuring a duration of the timer in connection with receiving an indication of the duration from a base station in a radio resource control message.

Aspect 6: A method of wireless communication performed by a base station, comprising: transmitting, to a user equipment (UE) in a radio resource control message, an indication of a duration for a timer that the UE is to use for attempting to transmit a feedback message after failing to transmit the feedback message at a time for which the feedback message is scheduled for transmission; and scheduling a time to receive the feedback message.

Aspect 7: A method of wireless communication performed by a user equipment (UE), comprising: starting a counter in connection with failing to transmit a feedback message at a time for which the feedback message is scheduled for transmission; deferring transmission of the feedback message for one or more attempts at transmitting the feedback message; incrementing the counter after each unsuccessful attempt at transmitting the buffered feedback message; and performing one of: transmitting the feedback message before the counter satisfies a count threshold, or and discarding the feedback message in connection with the counter satisfying the count threshold.

Aspect 8: The method of Aspect 7, wherein the feedback message is a hybrid automatic repeat request (HARQ) acknowledgment or a HARQ negative acknowledgement.

Aspect 9: The method of Aspect 7 or 8, wherein failing to transmit the feedback message includes refraining from transmitting the feedback message based at least in part on determining that a higher priority uplink communication is to be transmitted at a time for which the feedback message is scheduled for transmission.

Aspect 10: The method of Aspect 7 or 8, wherein failing to transmit the feedback message includes refraining from transmitting the feedback message based at least in part on determining that a higher priority downlink communication is to be received at a time for which the feedback message is scheduled for transmission.

Aspect 11: The method of any of Aspects 7-10, further comprising configuring the count threshold for the counter in connection with receiving an indication of the count threshold from a base station in a radio resource control message.

Aspect 12: A method of wireless communication performed by a base station, comprising: transmitting, to a user equipment (UE) in a radio resource control message, an indication of a count threshold for a counter that the UE is to use for attempting to transmit a feedback message after failing to transmit the feedback message at a time for which the feedback message was scheduled for transmission; and scheduling a time to receive the feedback message.

Aspect 13: A method of wireless communication performed by a user equipment (UE), comprising: starting a timer in connection with failing to transmit a feedback message at a time for which the feedback message is scheduled for transmission; buffering the feedback message for one or more attempts at transmitting the feedback message; and performing one of: transmitting the buffered feedback message before expiration of the timer, or discarding the buffered feedback message after expiration of the timer.

Aspect 14: The method of Aspect 13, wherein the feedback message is a hybrid automatic repeat request (HARQ) acknowledgment or a HARQ negative acknowledgement.

Aspect 15: The method of Aspect 13 or 14, wherein failing to transmit the feedback message includes refraining from transmitting the feedback message based at least in part on determining that a higher priority uplink communication is to be transmitted at a time for which the feedback message is scheduled for transmission.

Aspect 16: The method of Aspect 13 or 14, wherein failing to transmit the feedback message includes refraining from transmitting the feedback message based at least in part on determining that a higher priority downlink communication is to be received at a time for which the feedback message is scheduled for transmission.

Aspect 17: The method of any of Aspects 13-16, further comprising configuring a duration of the timer in connection with receiving an indication of the duration from a base station in a radio resource control message.

Aspect 18: A method of wireless communication performed by a base station, comprising: transmitting, to a user equipment (UE) in a radio resource control message, an indication of a duration for a timer that the UE is to use for attempting to transmit a feedback message after failing to transmit the feedback message at a time for which the feedback message is scheduled for transmission; and scheduling a time to receive the feedback message.

Aspect 19: A method of wireless communication performed by a user equipment (UE), comprising: starting a counter in connection with failing to transmit a feedback message at a time for which the feedback message is scheduled for transmission; buffering the feedback message for one or more attempts at transmitting the feedback message; incrementing the counter after each unsuccessful attempt at transmitting the buffered feedback message; and performing one of: transmitting the buffered feedback message before the counter satisfies a count threshold, or discarding the buffered feedback message in connection with the counter satisfying the count threshold.

Aspect 20: The method of Aspect 19, wherein the feedback message is a hybrid automatic repeat request (HARQ) acknowledgment or a HARQ negative acknowledgement.

Aspect 21: The method of Aspect 19 or 20, wherein failing to transmit the feedback message includes refraining from transmitting the feedback message based at least in part on determining that a higher priority uplink communication is to be transmitted at a time for which the feedback message is scheduled for transmission.

Aspect 22: The method of Aspect 19 or 20, wherein failing to transmit the feedback message includes refraining from transmitting the feedback message based at least in part on determining that a higher priority downlink communication is to be received at a time for which the feedback message is scheduled for transmission.

Aspect 23: The method of any of Aspects 19-22, further comprising configuring the count threshold for the counter in connection with receiving an indication of the count threshold from a base station in a radio resource control message.

Aspect 24: A method of wireless communication performed by a base station, comprising: transmitting, to a user equipment (UE) in a radio resource control message, an indication of a count threshold for a counter that the UE is to use for attempting to transmit a feedback message after failing to transmit the feedback message at a time for which the feedback message was scheduled for transmission; and scheduling a time to receive the feedback message.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   start a timer after failing to transmit a feedback message at a scheduled transmission time for the feedback message;
   defer transmission of the feedback message for one or more attempts at transmitting the feedback message; and
   perform one of: transmitting the feedback message before expiration of the timer, or discarding the feedback message after expiration of the timer.

2. The UE of claim 1, wherein the feedback message is a hybrid automatic repeat request (HARQ) acknowledgment or a HARQ negative acknowledgement.

3. The UE of claim 1, wherein the one or more processors, to fail to transmit the feedback message, are configured to refrain from transmitting the feedback message based at least in part on determining that a higher priority uplink communication is to be transmitted at the scheduled transmission time.

4. The UE of claim 1, wherein the one or more processors, to fail to transmit the feedback message, are configured to refrain from transmitting the feedback message based at least in part on determining that a higher priority downlink communication is to be received at the scheduled transmission time.

5. The UE of claim 1, wherein the one or more processors are configured to configure a duration of the timer in connection with receiving an indication of the duration from a base station in a radio resource control message.

6. A base station for wireless communication, comprising:
   a memory; and
   one or more processors, coupled to the memory, configured to:
   transmit, to a user equipment (UE) in a radio resource control message, an indication of a duration for a timer that the UE is to use for attempting to transmit a feedback message after failing to transmit the feedback message at a scheduled transmission time for the feedback message; and
   schedule a time to receive the feedback message.

7. A user equipment (UE) for wireless communication, comprising:
   a memory; and
   one or more processors, coupled to the memory, configured to:
   start a counter after failing to transmit a feedback message at a scheduled transmission time for the feedback message;
   defer transmission of the feedback message for one or more attempts at transmitting the feedback message;
   increment the counter after each unsuccessful attempt at transmitting the feedback message; and
   perform one of: transmitting the feedback message before the counter satisfies a count threshold, or discarding the feedback message in connection with the counter satisfying the count threshold.

8. The UE of claim 7, wherein the feedback message is a hybrid automatic repeat request (HARQ) acknowledgment or a HARQ negative acknowledgement.

9. The UE of claim 7, wherein the one or more processors, to fail to transmit the feedback message, are configured to refrain from transmitting the feedback message based at least in part on determining that a higher priority uplink communication is to be transmitted at the scheduled transmission time.

10. The UE of claim 7, wherein the one or more processors, to fail to transmit the feedback message, are configured to refrain from transmitting the feedback message based at least in part on determining that a higher priority downlink communication is to be received at the scheduled transmission time.

11. The UE of claim 7, wherein the one or more processors are configured to configure the count threshold for the counter in connection with receiving an indication of the count threshold from a base station in a radio resource control message.

12. A base station for wireless communication, comprising:
   a memory; and
   one or more processors, coupled to the memory, configured to:

transmit, to a user equipment (UE) in a radio resource control message, an indication of a count threshold for a counter that the UE is to use for attempting to transmit a feedback message after failing to transmit the feedback message at a scheduled transmission time for the feedback message; and schedule a time to receive the feedback message.

13. The UE of claim 1, wherein the timer starts at an end of the scheduled transmission time.

* * * * *